United States Patent
Denk et al.

(10) Patent No.: US 11,198,319 B2
(45) Date of Patent: Dec. 14, 2021

(54) METHOD FOR PRODUCING AN ABRASION-RESISTANT WOOD COMPOSITE BOARD AND PRODUCTION LINE THEREFOR

(71) Applicant: Flooring Technologies Ltd., Kalkara (MT)

(72) Inventors: Andre Denk, Wittstock/Dosse (DE); Maika George, Sinzheim (DE); Sabrina Pfeiffer, Kyritz (DE); Björn Burgmann, Wesenberg (DE)

(73) Assignee: Flooring Technologies Ltd., Kalkara (MT)

( * ) Notice: Subject to any disclaimer, the term of this patent is extended or adjusted under 35 U.S.C. 154(b) by 0 days.

(21) Appl. No.: 16/761,937

(22) PCT Filed: Nov. 5, 2018

(86) PCT No.: PCT/EP2018/080152
§ 371 (c)(1),
(2) Date: May 6, 2020

(87) PCT Pub. No.: WO2019/086660
PCT Pub. Date: May 9, 2019

(65) Prior Publication Data
US 2020/0376886 A1    Dec. 3, 2020

(30) Foreign Application Priority Data
Nov. 6, 2017  (EP) ..................................... 17200109

(51) Int. Cl.
*B05D 7/00*     (2006.01)
*B05D 7/08*     (2006.01)
(Continued)

(52) U.S. Cl.
CPC ............ *B44C 5/0476* (2013.01); *B05C 9/022* (2013.01); *B05C 9/04* (2013.01); *B05C 9/06* (2013.01);
(Continued)

(58) Field of Classification Search
CPC ......... B44C 5/0476; B44C 5/043; B44C 3/02; B05D 1/28; B05D 1/38; B05D 3/0227;
(Continued)

(56) References Cited

U.S. PATENT DOCUMENTS 4,940,503 A    7/1990  Lindgren et al.
6,465,046 B1   10/2002 Hansson et al.
(Continued)

FOREIGN PATENT DOCUMENTS

CA    2283835 A1    8/1999
CH     648979 A3    4/1985
(Continued)

OTHER PUBLICATIONS

Particle Board vs Oriented Strand Board: How Are They Different? Published Aug. 26, 2015. Retrieved from https://web.archive.org/web/20150826012716/https://www.builddirect.com/learning-center/building-materials/particleboard-oriented-strand/ on Jan. 14, 2021. (Year: 2015).*
(Continued)

*Primary Examiner* — William P Fletcher, III
(74) *Attorney, Agent, or Firm* — The Webb Law Firm (57) ABSTRACT

A method for producing an abrasion-resistant wood-based panel with a top side and a bottom side, wherein at least one decorative layer, in particular as a printed decoration, is provided on the top side, includes applying at least one first resin layer to the at least one decorative layer on the top side of the wood-based panel, uniformly scattering abrasion-resistant particles onto the first resin layer on the top side of (Continued)

the wood-based panel; wherein the first resin layer on the top side of the wood-based panel provided with the abrasion-resistant particles is not dried after application, and applying at least one second resin layer to the first, moist resin layer provided with the abrasion-resistant particles on the top side of the wood-based panel, then drying the assembly of first resin layer and second resin layer on the top side of the wood-based panel in at least one drying apparatus.

21 Claims, 2 Drawing Sheets

(51) Int. Cl.

| | | |
|---|---|---|
| *B05C 9/02* | (2006.01) | |
| *B05C 9/04* | (2006.01) | |
| *B05C 9/06* | (2006.01) | |
| *B05C 19/00* | (2006.01) | |
| *B44C 5/04* | (2006.01) | |
| *B32B 21/02* | (2006.01) | |

(52) U.S. Cl.
CPC .............. *B05C 19/00* (2013.01); *B05D 7/08* (2013.01); *B05D 7/542* (2013.01); *B05D 2203/20* (2013.01); *B05D 2252/10* (2013.01); *B05D 2451/00* (2013.01); *B32B 21/02* (2013.01); *B32B 2260/046* (2013.01); *B32B 2307/554* (2013.01)

(58) Field of Classification Search
CPC ...... B05D 3/0254; B05D 3/0272; B05D 5/00; B05D 5/02; B05D 5/08; B05D 7/08; B05D 7/542; B05D 7/587; B05D 2252/10; B05D 2518/00; B05D 2601/26; B05D 2601/22; B05D 2203/20; B05D 2451/00; B05D 7/06; B32B 21/02; B32B 21/042; B32B 21/08; B32B 21/12; B32B 21/14; B32B 9/042; B32B 9/048; B32B 27/08; B32B 27/14; B32B 27/42; B32B 37/10; B32B 38/145; B32B 2255/08; B32B 2264/101; B32B 2264/2013; B32B 2317/16; B32B 2361/00; B32B 2307/554; B32B 2260/046; E04C 2/10; E04C 2/12; E04C 2/16; E04C 2/24; E04C 2/26; E04C 2/28

See application file for complete search history.

(56) References Cited

U.S. PATENT DOCUMENTS

| | | |
|---|---|---|
| 6,555,216 B2 | 4/2003 | Chen et al. |
| 8,173,240 B2* | 5/2012 | Dohring .................. B32B 29/00 428/80 |
| 8,512,804 B2 | 8/2013 | Oldorff |
| 8,969,219 B2 | 3/2015 | Gvishi |
| 8,993,049 B2 | 3/2015 | Pervan |
| 10,406,558 B2 | 9/2019 | Döhring et al. |
| 2010/0098963 A1 | 4/2010 | Dohring et al. |
| 2010/0221493 A1 | 9/2010 | Hintze |
| 2011/0117340 A1 | 5/2011 | Oldorff |
| 2011/0217463 A1* | 9/2011 | Oldorff .................... B05C 1/08 427/209 |
| 2014/0044958 A1* | 2/2014 | Steinmann ............ B05B 7/1454 428/342 |
| 2014/0255670 A1 | 9/2014 | Kalwa |
| 2014/0290171 A1 | 10/2014 | Vermeulen |
| 2015/0097907 A1 | 4/2015 | Kalwa et al. |
| 2019/0160859 A1 | 5/2019 | Kalwa et al. |

FOREIGN PATENT DOCUMENTS

| | | |
|---|---|---|
| CN | 101374655 A | 2/2009 |
| CN | 102171057 A | 8/2011 |
| CN | 102264802 A | 11/2011 |
| CN | 102294722 A | 12/2011 |
| CN | 104314272 A | 1/2015 |
| CN | 104520080 A | 4/2015 |
| DE | 10117807 B4 | 10/2002 |
| DE | 102004031547 A1 | 3/2005 |
| EP | 0329154 B1 | 11/1993 |
| EP | 2314381 A1 | 4/2011 |
| EP | 2189282 B1 | 5/2011 |
| EP | 2463116 B1 | 11/2013 |
| EP | 2774770 B1 | 4/2015 |
| EP | 2977219 A1 | 1/2016 |
| EP | 3246175 A1 | 11/2017 |
| EP | 3351402 B1 | 4/2019 |
| RU | 2015886 C1 | 7/1994 |
| RU | 2419495 C2 | 5/2011 |
| WO | 0148333 A1 | 7/2001 |
| WO | 2007042258 A1 | 4/2007 |
| WO | WO-2007042258 A1 * | 4/2007 ............ B44C 5/043 |
| WO | 2010112125 A1 | 10/2010 |
| WO | 2011076305 A1 | 6/2011 |

OTHER PUBLICATIONS

Merline, D., Vukusic, S. & Abdala, A. Melamine formaldehyde: curing studies and reaction mechanism. Polym J 45, 413-419 (2013) . https://doi.org/10.1038/pj.2012.162 (Year: 2013).*

Xu et al., "The effect of fillers on the wear resistance of thermoplastic polymeric coatings", Elsevier, 2001, pp. 1522-1531, vol. 251.

* cited by examiner

FIG 1

METHOD FOR PRODUCING AN ABRASION-RESISTANT WOOD COMPOSITE BOARD AND PRODUCTION LINE THEREFOR

CROSS-REFERENCE TO RELATED APPLICATIONS

This application is the United States national phase of International Application No. PCT/EP 2018/080152 filed Nov. 5, 2018, and claims priority to European Patent Application No. 17200109.1 filed Nov. 6, 2017, the disclosures of which are hereby incorporated by reference in their entirety.

BACKGROUND OF THE INVENTION

Field of the Invention

The present invention concerns a method for producing an abrasion-resistant wood-based panel provided with a decorative layer and a production line for carrying out this method.

Description of Related Art

A large number of products or product surfaces that are subject to wear and tear due to mechanical stress must be protected from premature damage or destruction due to wear and tear by applying wear-resistant coatings. These products can be furniture, interior finishing panels, floors, etc. Depending on the frequency and strength of use, different protective measures must be applied to guarantee the user the longest possible service life.

A large number of the above mentioned products have decorative surfaces that quickly become unsightly and/or difficult to clean when worn due to intensive use. These decorative surfaces very often consist of papers impregnated with duroplastic resins, which are pressed onto the wood-based substrates used in so-called short-cycle presses. Melamine-formaldehyde resin is very often used as the thermosetting resin.

One approach to improve the wear resistance of decorative surfaces consists in the application or introduction of abrasion-resistant particles into the resin layers close to the surface. This can be done, for example, by applying a liquid resin containing abrasion-resistant particles to the corresponding surfaces, whereby in the case of decorative wood-based panels, corundum particles are usually used as abrasion-resistant particles. When applying corundum-containing melamine resin, however, it has been shown that problems due to sedimentation occur due to the differences in density between the melamine resin and the corundum. This leads to sedimentation in preparation tanks, pumps, pipelines and the roller application units. Therefore, on the one hand, the entire area must often be cleaned to remove the deposits and, on the other hand, a higher corundum application rate must be used to achieve a certain wear value. In addition, the aforementioned sedimentation leads to inhomogeneities in the application units, which must also be compensated for by higher dosing. A further serious disadvantage of this technology is that the corundum-containing resin formulations cause considerable wear on all plant components that come into contact with the resin formulation. The higher dosage in combination with the sedimentation problems in turn leads to poorer transparency at higher wear classes. This is particularly noticeable with dark decors.

In order to avoid sedimentation of the corundum particles in the liquid resin and the problems associated with this, another approach to applying the abrasion-resistant particles is to scatter them onto a still liquid resin layer applied to the wood-based panel using a suitable device. Here it is apparent that the corundum particles do not immediately and completely penetrate into the resin layer, but lie partially loose on top of each other. The loose corundum particles can be blown off by subsequent air currents, as in the case of a downstream circulating air dryer, which dries the moist melamine resin layer, whereby this corundum is lost to its intended function (abrasion) and instead leads to wear in downstream plant components, such as the dryer.

This results in various disadvantages for production. For example, it has been observed that electrostatic charging of the corundum particles prevents the formation of a homogeneous scattering curtain. Furthermore, the whirling in the convection dryer leads to a loss of corundum and requires an increased amount of corundum; the dryer is contaminated by the corundum; rapid wear of the transport chains in the dryer by corundum; i.e. overall increased material costs due to corundum loss and chain wear. In addition, the strong air flow in the dryer causes a distribution of the fine corundum in the production hall, which represents a health hazard for the employees present. Production downtime can also be caused by contamination of the optical sensors of the plant by corundum dust.

SUMMARY OF THE INVENTION

The present invention is therefore based on the technical object of avoiding and improving the above mentioned disadvantages of the previous approach to scattering abrasion-resistant particles on wood-based panels coated with liquid resin.

According to the invention, the set object is solved by a process with the features described in the present application and a production line with the features described in the present application.

Accordingly, a process for the production of an abrasion-resistant wood-based panel with an top side and an bottom side is provided, wherein at least one decorative layer, in particular as a printed decoration, is provided on the top side, and wherein a protective layer of a not yet completely cured formaldehyde resin is applied to the decorative layer, which comprises the following steps:

applying at least one first resin layer to the at least one decorative layer on the top side of the wood-based panel, wherein the wood-based panel provided with the protective layer and decorative layer is not heated in a dryer before the application of the first resin layer, even scattering of abrasion-resistant particles on the first resin layer on the top side of the wood-based panel, wherein the first resin layer on the top side of the wood-based panel provided with the abrasion-resistant particles is not dried after application, and applying at least a second layer of resin to the first, (still) moist resin layer on the top side of the wood-based panel, which is provided with the abrasion-resistant particles, subsequent drying of the structure consisting of the first resin layer and the second resin layer on the top side of the wood-based panel in at least one drying device.

The present process therefore enables the provision of wood-based panels with a decorative layer in various formats with high wear resistance in a cost-effective manner. According to the present process, a first resin layer, in particular in the form of a first thermosetting resin layer, such as a melamine-formaldehyde resin layer, is applied to the decorative layer (pretreated or non-pretreated) of the wood-based panel. The first resin layer is not initially dried or partially dried, but rather the abrasion-resistant particles are evenly scattered onto the wet or still liquid first resin layer on the top side of the wood-based panel using a suitable scattering device. Since the first resin layer is still liquid at the time of scattering, the abrasion-resistant particles can sink into the resin layer. Subsequently (i.e. without intermediate drying of the first resin layer with the abrasion-resistant particles scattered thereon) a second resin layer is applied to the still moist first resin layer. This is done by installing an additional application unit directly behind the scattering device (i.e. between the first dryer and the scattering device). With its roller application, the additional applicator takes up the abrasion-resistant particles that are not fixed on the first resin layer or have not penetrated the first resin layer and transports them back to the resin applicator. There a compensating concentration is set and the removed abrasion-resistant particles are evenly applied to the next surfaces via the roller. This results in an enrichment of the abrasion-resistant particles in the second application unit up to a content of abrasion-resistant particles of max. 10%.

In addition to preventing loose particles from being blown away or absorbed, this also reduces or even largely eliminates the adverse effect of corundum particles protruding from the coated surface on a subsequent press plate, for example.

With the present process, a reduction in the consumption of abrasion-resistant material is possible, as there is no loss of abrasion-resistant particles such as corundum in the dryer. At the same time, a reduction in dust pollution of the environment and the obvious health hazard for employees; as well as corundum dust deposits on plant components of the production line is achieved. A significant advantage is also the reduction of corundum deposits on the transport chains, thus saving additional material costs by replacing the chains. In addition, the service life of the press plates in the downstream pressing process for laminate formation is increased. Overall, the process costs are reduced due to lower material and maintenance costs. Furthermore, no new devices/equipment have to be installed in the production line.

According to the invention, the wood-based panel provided with the decorative layer is not heated in a dryer, such as an IR dryer, before the first resin layer is applied. This can be done by switching off an IR dryer provided in the production line or by not having an IR dryer in the production line. By avoiding the heating of the wood-based panel with a decorative layer, no electrostatic charging of the panel surface occurs and the scattering curtain becomes homogeneous when scattering the corundum.

It is not obvious for an expert to dispense with heating the printed wood-based panel in an IR dryer, since a protective layer of resin is typically applied to the decorative layers applied by direct printing. The protective layer may be a formaldehyde-containing resin, in particular a melamine-formaldehyde resin, urea-formaldehyde resin or melamine-urea-formaldehyde resin, and may contain glass spheres (size 50-150µ) as spacers for intermediate storage of the boards. This protective layer serves as a temporary protection of the decorative layer for storage before further finishing. The protective layer on the decorative layer is not yet fully cured, but has a certain residual moisture content of approx. 10%, preferably approx. 6%, and can be crosslinked even further. Such protective layers are described, for example, in WO 2010/112125 A1 or EP 2 774 770 B1.

The typical step of heating decorative layers provided with such a thermosetting protective layer is to dry the protective layer and to adjust the residual moisture level and thus the stickiness of the protective layer and the adhesion of subsequent resin layers.

In the case of the present method, however, it has been shown that the step of heating the protective layer has a negative effect on the scattering pattern of the abrasion-resistant particles. Omitting the heating of the printed wood-based panel provided with a protective layer causes a homogenisation of the scatter pattern and thus an even distribution of the abrasion-resistant particles on the panel surface.

The resin layers used in the present process are preferably based on aqueous formaldehyde-containing resins, especially melamine-formaldehyde resin, urea-formaldehyde resin or melamine-urea-formaldehyde resin.

From WO 2007/042258 A1, a process for the production of abrasion-resistant boards with a decorative surface and abrasion-resistant particles scattered thereon is known, in which an HDF board is printed after appropriate pretreatment (primer, base coat) in a gravure printing process and the printed motif is dried, but the lacquer system used differs substantially from the aqueous resin system used in accordance with the invention.

For example, in WO 2007/042258 A1 an acrylate-containing polyester resin (LaromerUP35D) is applied as a base coat with a quantity of 20-50 g/m$^2$. Corundum particles or aluminium oxide particles are sprinkled onto the not yet cured lacquer. A top coat is then applied to the wet base coat with the scattered abrasion-resistant particles. A radiation-curable acrylic resin (Laromer LR8987) is used as the base resin for the top coat. After application of the first coat of paint, it is not at least partially cured or gelled to fix the lacquer. This procedure is known to a specialist for lacquer systems containing acrylate. Such lacquer systems are mixed with reactive thinner and photoinitiators for processing, which serves to adjust the viscosity, surface properties and degree of cross-linking of the cured paint. During the curing process, the reactive thinner is incorporated 100% into the lacquer, so that the amount applied is also the amount that remains on the plate. Drying to remove a solvent is therefore not necessary either before or after applying the coating. On the contrary, heating before and/or after the varnish application could lead to undesired evaporation of the reactive thinner, which is irritating like the acrylic varnish systems; the application of heat must be avoided accordingly during processing.

In contrast to the lacquer systems of WO 2007/042258 A1, aqueous resin systems, especially aqueous formaldehyde-containing resin systems, are used in the present process. These aqueous resin systems have to be dried in the manufacturing process. For polymerization by polycondensation and from this a final product can be produced. Accordingly, it is not obvious to dispense with one or more heating or drying steps in a process for the production of refined wood-based panels in which aqueous resin systems are applied.

The first layer of resin is applied in a variant of the process in an amount between 10-100 g/m$^2$, preferably 40-80 g/m$^2$, especially preferably 45-60 g/m$^2$. The first resin layer is applied, for example, with a grooved application roller in a first application unit. The solids content of the first resin layer is between 50-70% by weight, preferably 50-60% by weight, especially preferably 55% by weight. The layer thickness of the first resin layer applied to the decorative layer is between 10 and 100 µm, preferably between 40 and 80 µm, especially preferably between 45 and 60 µm.

In a further version of the present process, particles of corundum (aluminium oxides), boron carbides, silicon dioxides, silicon carbides are used as abrasion-resistant particles. Corundum particles are particularly preferred. These are preferably white high-grade corundum with a high transparency, so that the optical effect of the underlying decoration is affected as little as possible. Corundum has an uneven spatial shape.

The amount of scattered abrasion-resistant particles is 10 to 50 g/m$^2$, preferably 10 to 30 g/m$^2$, especially preferably 15 to 25 g/m$^2$. The quantity of abrasion-resistant particles scattered depends on the abrasion class to be achieved. For example, the quantity of abrasion-resistant particles scattered ranges between 10 to 15 g/m$^2$ in the case of abrasion class AC3, between 15 to 20 g/m$^2$ in abrasion class AC4 and between 20 to 25 g/m$^2$ in abrasion class AC5. In the present case, the finished panels preferably have abrasion class AC4.

Abrasion-resistant particles with grain sizes in the classes F180 to F240, preferably F200, are used. The grain size of class F180 covers a range of 53-90 µm, F220 of 45-75 µm, F230 34-82 µm, F240 28-70 µm (FEPA standard). In one variant, white fused alumina F180 to F240 are used as abrasion-resistant particles, preferably in a main particle size range of 53-90 µm. In a particularly preferred version, class F200 corundum particles are used, where F200 is a mixture between F180 and F220 and has a diameter between 53 and 75 µm.

The abrasion-resistant particles must not be too fine-grained (risk of dust formation), but also not too coarse-grained. The size of the abrasion-resistant particles is therefore a compromise. Overall, however, the corundum particles should be larger than the entire top layer to provide abrasion resistance.

Silanized corundum particles can be used in a more advanced form. Typical silanizing agents are aminosilanes.

In a further variant of the present method, the resin to be applied as the first resin layer on top of the wood-based panel may contain fibres, in particular wood fibres or cellulose fibres. The application rate of the fibres, such as cellulose fibres, when applied together with the first resin layer, is between 0.1-0.5 g/m$^2$, preferably 0.2-0.4 g/m$^2$, particularly preferably 0.25 g/m$^2$. The addition of fibres such as cellulose fibres to the first layer contributes to increasing the viscosity of the resin liquor and thus to an increased application of the first top layer to the wood-based panel.

In a further version of the present process, the second resin layer to be applied to the top of the wood-based panel is applied in an amount of between 10-50 g/m$^2$, preferably 20-30 g/m$^2$, in particular preferably 20-25 g/m$^2$. Overall, the amount of the second resin layer is less than the amount of the first resin layer.

The total amount of the first and second resin layer is between 50-100 g/m$^2$, preferably 60-80 g/m$^2$, especially preferably 70 g/m$^2$. Thus, in one variant, the amount of the first resin layer is 50 g/m$^2$ and the amount of the second resin layer is 25 g/m$^2$.

As already mentioned above, an accumulation of abrasion-resistant particles in the second resin layer occurs due to the entrainment of loose particles by the second coating unit. Thus, the resin to be applied as the second resin layer may contain 5 to 15 wt %, preferably 10 wt %, of abrasion-resistant particles.

In another version, the at least one wood-based panel is a medium density fibreboard (MDF), high density fibreboard (HDF) or coarse particle board (OSB) or plywood and/or a wood-plastic panel.

In one version, a resin layer is also applied to the bottom side of the wood-based panel parallel to the second resin layer on the top side of the panel. The amount of resin layer applied to the bottom side of the wood-based panel can be between 50-100 g/m$^2$, preferably 60-80 g/m$^2$, and especially preferably 60 g/m$^2$. Preferably, the lower resin layer (e.g. brownish) is coloured to simulate a countermove.

The solids content of the resin used for the top and bottom side is 50-70% by weight for both the top and bottom side, preferably 50-60% by weight, and in particular preferably 55% by weight.

The second resin layer is preferably applied parallel or simultaneously to the top and bottom side of the wood-based panel in at least one double application device (roller application unit). After application of the second resin layer, drying (air drying) of the structure consisting of first and second resin layer takes place in a first drying device. Accordingly, at least one resin layer is applied to the bottom side of the wood-based panel together with the second resin layer to be applied to the top side of the panel.

The resin layer(s) applied to the bottom side act as a countermove. Applying the resin layers to the top side and bottom side of the wood-based panels in approximately equal quantities ensures that the tensile forces on the wood-based panel caused by the layers applied during pressing cancel each other out. The counter-tension applied to the bottom side corresponds in the layer structure and the respective layer thickness approximately to the layer sequence applied to the top side with the difference of the abrasion-resistant particles and glass beads as explained in detail below.

In a further embodiment of the present method, at least one further resin layer, preferably a third, fourth, fifth, sixth and seventh resin layer, is applied to the dried structure consisting of the first and second resin layer provided with the abrasion-resistant particles on the top side of the wood-based panel and dried after each application.

It is also preferred that the other resin layers include glass beads and/or fibres, especially wood fibres or cellulose fibres.

This allows a third resin layer to be applied in parallel to the top and bottom sides of the wood-based panel, i.e. to the respective dried resin structure. In the case of the top side, this would be the resin structure consisting of the first and second resin layer including the abrasion-resistant particles and in the case of the bottom side, this would be a resin layer.

The amount of the third resin layer applied to the top side of the wood-based panel can be between 10-50 g/m$^2$, preferably 20-30 g/m$^2$, especially preferably 25 g/m$^2$.

The amount of resin layer applied in parallel to the bottom side of the wood-based panel can be between 30-80 g/m$^2$, preferably 40-60 g/m$^2$, and especially preferably 50 g/m$^2$.

The solid content of the resin used for the third resin layer is 50-70 wt % for both the top and bottom side, preferably 50-60 wt %, especially preferably 55 wt %.

In a further embodiment of the present method, at least a fourth layer of resin is applied to the top and parallel to the bottom of the wood-based panel.

The amount of the fourth resin layer applied to the top side of the wood-based panel can be between 10-40 g/m$^2$, preferably 15-30 g/m$^2$, in particular preferably 20 g/m$^2$, with a solids content of between 50-80 wt %, preferably 60-70 wt %, in particular preferably 60-65 wt %, e.g. 61.5 wt %.

In one variant, the resin to be applied as a fourth resin layer to the top of the wood-based panel may contain glass beads, with the glass beads preferably acting as spacers. The preferred glass beads have a diameter of 50-100 µm, preferably 60-80 µm. The application rate of the glass beads, when applied together with the third resin layer, is 1-5 g/m², preferably 2-4 g/m², especially preferably 3 g/m².

In another variant, the glass beads can be sprinkled onto the fourth resin layer applied to the top of the wood-based panel. In this case, i.e. when the glass beads are scattered, the application rate of the glass beads is 5-10 g/m², preferably 6-8 g/m², especially preferably 6 g/m².

The amount of resin layer applied in parallel to the bottom side of the wood-based panel can be between 20-70 g/m², preferably 30-50 g/m², especially preferably 40 g/m² with a solids content of 50-70 wt %, preferably 50-60 wt %, especially preferably 55 wt %.

It is also advantageous if the resin layer applied to the top side and bottom side of the wood-based panel is dried in at least one drying device.

Following the drying process for the fourth top resin layer and parallel lower resin layer, it is optionally possible to apply at least one fifth resin layer each to the top side and bottom side of the wood-based panel.

The amount of the fifth resin layer applied to the top side of the wood-based panel can be between 10-40 g/m², preferably 15-30 g/m², especially preferably 20 g/m² at a solids content of 50-80 wt %, preferably 60-70 wt %, especially preferably 60-65 wt %, e.g. 61.6 wt %.

In a further variant of the present method, the resin to be applied as a fifth resin layer on the top of the wood-based panel may contain glass beads. If glass beads are added to the resin to be applied, the amount of glass beads applied is 1-5 g/m², preferably 2-4 g/m², especially preferably 3 g/m².

The amount of resin layer applied in parallel to the bottom side of the wood-based panel can be between 10-60 g/m², preferably 20-50 g/m², in particular preferably 30 g/m² with a solids content of 50-70 wt %, preferably 50-60 wt %, in particular preferably 55 wt %.

In an even more advanced variant of the present process, a sixth and a seventh resin layer are applied to the top side and the complementary resin layers to the bottom side of the wood-based panel. The sixth and seventh resin layers applied to the top surface may also contain fibres or glass beads.

It should also be noted that additives such as hardeners, wetting agents, defoamers, release agents and/or other components can be added to all resin layers.

The sixth and seventh resin layers (as final layers) applied to the top side and bottom side of the wood-based panel are each dried in at least one further drying device assigned to the respective coating unit. The drying of the respective resin layers is preferably carried out to a residual moisture of 6-9% by weight, e.g. in a circulating air dryer.

In the pressing step following the last drying step, the layer structure is pressed under the influence of pressure and temperature in a short-cycle press at temperatures between 150 and 250° C., preferably between 180 and 230° C., especially preferably at 200° C. and a pressure between 100 and 1000 N/cm², preferably 300 and 700 N/cm², especially preferably between 400 and 600 N/cm².

The decorative layer mentioned above can be applied by direct printing. In the case of direct printing, a water-based pigmented printing ink is applied by gravure or digital printing, whereby the water-based pigmented printing ink can be applied in more than one layer, e.g. in the form of two to ten layers, preferably three to eight layers.

In the case of direct printing, the application of at least one decorative layer is carried out as mentioned above by means of an analogue gravure and/or digital printing process. The cravure printing process is a printing technique in which the elements to be depicted are present as depressions in a printing form which is inked before printing. The printing ink is mainly located in the depressions and is transferred to the object to be printed, such as a wood fibre carrier board, due to the contact pressure of the printing forme and adhesive forces. In digital printing, on the other hand, the print image is transferred directly from a computer to a printing machine, such as a laser printer or inkjet printer. This eliminates the need for a static printing form. In both processes, the use of aqueous inks and inks or UV-based colouring agents is possible. It is also conceivable to combine the above-mentioned printing techniques from gravure and digital printing. A suitable combination of the printing techniques can be carried out directly on the carrier plate or the layer to be printed or even before printing by adapting the electronic data sets used.

It is also possible that there is at least one base coat layer between the wood-based panel or carrier board and the at least one decorative layer.

The base coat layer preferably used for this purpose comprises a composition of casein as binder and inorganic pigments, in particular inorganic colour pigments. White pigments such as titanium dioxide can be used as colour pigments in the base coat layer or other colour pigments such as calcium carbonate, barium sulphate or barium carbonate. In addition to the colour pigments and casein, the base coat layer may also contain water as a solvent. It is also preferred if the pigmented base coat layer applied consists of at least one, preferably at least two, in particular preferably at least four successive layers or coats, where the quantity applied between the layers or coats may be the same or different.

The present method thus enables the production of an abrasion-resistant wood-based panel with a decorative layer and a resin structure with abrasion-resistant particles. The wood-based panel provided with a decorative layer comprises a resin structure of first and second resin layers on the top side, each containing abrasion-resistant particles, a corresponding resin layer on the bottom side, at least one third resin layer on the top side and a corresponding resin layer on the bottom side of the wood-based panel, at least one fourth, fifth, sixth and seventh resin layer on the top side and resin layers each corresponding thereto on the bottom side of the wooden material panel, wherein glass beads may be contained in each of the fourth to seventh resin layers provided on the top side of the wooden material panel.

In a preferred design, the present process enables the production of an abrasion-resistant wood-based panel with the following layer structure (seen from bottom to top): Counteracting layer consisting of six resin layers—wood-based panel—base coat layer—print decoration layer—protective layer, in particular a protective layer of a not yet completely cured resin—first resin layer with cellulose fibres—layer of abrasion-resistant particles—second resin layer—third resin layer—fourth resin layer with glass beads—fifth resin layer with glass beads—sixth resin layer with glass beads—seventh resin layer with glass beads.

The protective layer serves to cover the decor and protect the decor during intermediate storage (stacking, storage, transport). The other resin layers on the top side together form an overlay that protects the finished laminate against abrasion.

The production line for carrying out the present process comprises the following elements:
- at least a first application device for applying a first layer of resin to the top surface of the wood-based panel,
- at least one device arranged downstream of the first application device in the processing direction for scattering a predetermined quantity of abrasion-resistant particles;
- at least one second application device arranged behind the first application device and scattering device in the processing direction for applying a second resin layer to the top side of the wood-based panel,
- at least one first drying device arranged downstream of the second application device in the processing direction for drying the layered structure of first and second resin layers.

In a preferred variant of the present production line, no drying device is provided before the first application device or, if a drying device is installed as part of the production line, this drying device is not in operation, i.e. not active.

There is also no drying device between the scattering device and the second application device. Instead, the still wet board is fed directly into the second application device after leaving the scattering device.

In a variant of the production line, the second application device for applying the second resin layer is designed as a double application device, so that a corresponding resin layer is applied to the bottom side of the wood-based panel simultaneously or parallel to the second resin layer on the top side.

In a further variant, the production line comprises at least one further application device arranged downstream of the first drying device in the processing direction for applying further resin layers to the top and/or bottom side of the carrier board and subsequent drying devices for drying the further top and/or bottom resin layers.

In an embodiment, the present production line as a whole comprises a simple, single-sided applicator for applying the first resin layer to the top side of the printed wood-based panel and six double applicators for applying six further resin layers to the top and lower sides of the wood-based panel, wherein at least one drying device for drying the top and/or lower resin layer is provided behind each double applicator.

The production line also preferably comprises a short-cycle press (KT press) arranged downstream of the last drying device in the processing direction.

In a preferred embodiment, the production line for carrying out the present process comprises the following elements:
- at least a first application device for applying a first layer of resin, which may contain fibres, to the top surface of the wood-based panel;
- at least one device arranged downstream of the first application device in the processing direction for scattering a predetermined quantity of abrasion-resistant particles;
- at least one second application device arranged behind the first application device and scattering device in the processing direction for applying a second resin layer to the top side of the wood-based panel,
- at least one first drying device arranged downstream of the second application device in the processing direction for drying the layered structure of first and second resin layers;
- at least one third application device arranged downstream of the first drying device in the direction of processing for applying a third resin layer to the top side and/or a resin layer parallel to the lower side of the carrier board,
- at least one further drying device arranged behind the third application device in the processing direction for drying the third top and/or corresponding lower resin layer;
- at least one fourth application device arranged downstream of the further drying device in the processing direction for applying a fourth resin layer to the top side, which may contain glass beads, for example, and/or a resin layer parallel to the bottom side of the carrier plate (without glass beads),
- at least one drying device arranged behind the fourth application device in the processing direction for drying the third top and/or corresponding lower resin layer;
- at least one fifth application device arranged downstream of the drying device in the direction of processing for applying a fifth resin layer, which may contain glass particles or glass beads, for example, to the top side and/or a resin layer parallel to the lower side of the support plate (without glass beads or fibres);
- at least one drying device arranged behind the fifth application device in the processing direction for drying the fifth top and/or corresponding lower resin layer;
- at least one sixth application device arranged behind the drying device in the processing direction for applying a sixth resin layer to the top side and/or a resin layer parallel to the lower side of the carrier plate
- at least one drying device arranged behind the sixth application device in the processing direction for drying the sixth top and/or corresponding lower resin layer;
- at least one seventh application device arranged behind the drying device in the processing direction for applying a seventh resin layer on the top side and/or a resin layer parallel to the lower side of the carrier plate
- at least one drying device arranged behind the seventh application device in the processing direction for drying the seventh top and/or corresponding lower resin layer;
- at least one short-cycle press arranged downstream of the last drying device in the processing direction.

The scattering device for the abrasion-resistant particles provided in the present production line is suitable for scattering powder, granules, fibres and includes an oscillating brush system. The scattering device essentially consists of a hopper, a rotating structured roller and a scraper. The application rate of abrasion-resistant material is determined by the rotational speed of the roller. The scattering device preferably comprises a spiked roller.

In a version of the present production line, it is further provided that the at least one scattering device is surrounded by or arranged in at least one booth provided with at least one means for removing dust occurring in the booth. The means for removing the dusts can be in the form of a suction device or also as a device for blowing in air. Air injection can be achieved by nozzles installed at the plate inlet and outlet, which blow air into the booth. In addition, these can prevent air movements from creating an inhomogeneous scattering curtain on abrasion-resistant material.

The removal of dust from abrasion-resistant material from the environment of the scattering device is advantageous, because apart from the obvious health risk for the workers working on the production line, the fine dust from abrasion-resistant particles is also deposited on other parts of the production line and leads to increased wear and tear of these parts. The arrangement of the scattering device in a cabin therefore not only serves to reduce the dust pollution of the production line environment, but also prevents premature wear and tear.

The scattering device is preferably controlled by a light barrier, whereby the light barrier is arranged in the processing direction in front of the roller (scattering roller) provided below the scattering device. The control of the scattering device by a light barrier is useful because there are more or less large gaps between the individual wood-based panels.

In an embodiment of the present scattering device, at least one hopper is provided in front of the scattering roller for collecting excess abrasion-resistant particles (i.e. not scattered on the at least one wood-based panel, but rather, before the wood-based panel is moved in by means of the transport device under the scattering roller in front of the same falling abrasion-resistant particles).

In a further variant, the hopper is coupled with at least one conveyor and a screening device, whereby the excess abrasion-resistant material collected in the hopper is transported to the screening device via the conveyor. The screening meshes of the screening device correspond to the largest grain of abrasion-resistant particulate material used (i.e. approx. 80-100 µm). In the screening device, dirt particles and lumpy material (such as lumpy resin or lumpy abrasion-resistant material) are separated from the collected abrasion-resistant material and the screened abrasion-resistant material can be returned (recycled) to the scattering device.

BRIEF DESCRIPTION OF THE DRAWINGS

The invention is explained in more detail below with reference to the figures in the drawings by means of an example of execution. Show it.

DESCRIPTION OF THE INVENTION

Figure 1:
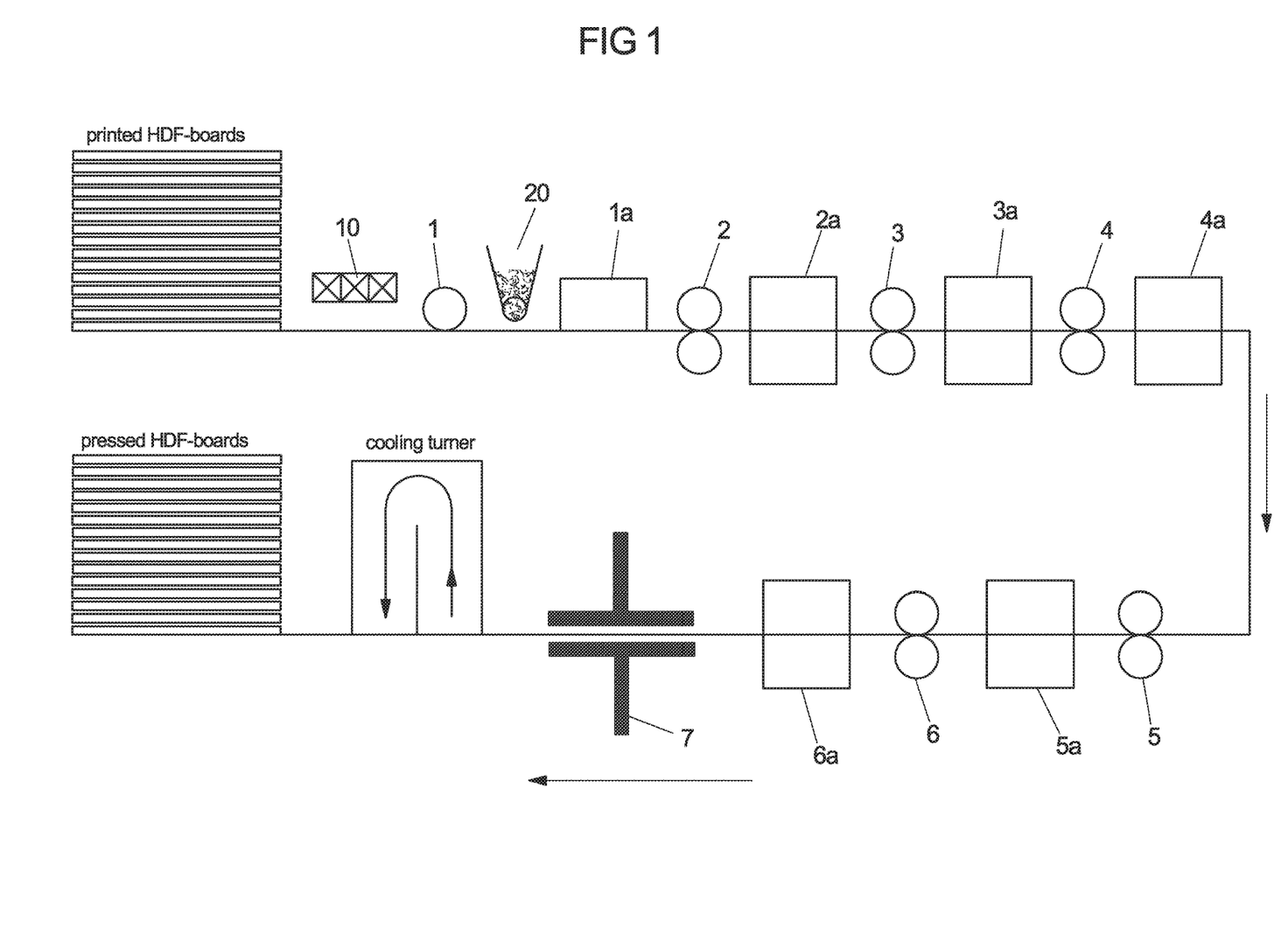
FIG. 1 is a schematic diagram of a wood-based panel production line using a conventional process.

The conventional production line shown schematically in FIG. 1 comprises an IR dryer 10, a single-sided applicator unit 1, and five double applicator units 2, 3, 4, 5, 6 for simultaneous application of the respective resin layer to the top and bottom sides of the separated printed material boards, e.g. of printed HDF boards, as well as four convection dryers 1a, 2a, 3a, 4a, 5a, 6a each arranged behind the applicator units in the processing direction.

Before the first resin application, the surface of the boards is preheated by the IR dryer 10 to a temperature of approx. 45° C. The resin is applied to the board surface via a rubberized roller in the applicator unit. The excess resin is pumped back into the application tank, from where it is transported back to the rollers.

After the first application roller 1, a first scattering device 20 is provided for evenly scattering the abrasion-resistant material such as corundum on the first resin layer on the top of the HDF board. The abrasion-resistant material used is corundum F200, which, according to the FEPA standard, measures approximately 53-75 µm in diameter. The scattering device 20 essentially consists of a storage hopper, a rotating, structured spiked roller and a scraper. The application rate of the material is determined by the rotational speed of the scattering roller. Depending on the required abrasion class of the product, between 12-25 g/m$^2$ corundum is scatter onto the resin-coated plate (AC4 (according to EN 13329)=20 g/m$^2$). From the spiked roller, the corundum falls at a distance of 5 cm onto the melamine resin treated panel. Since the first resin layer is still liquid at the time of scattering, the abrasion-resistant particles can sink into the resin layer. Below the present scattering device, in front of the scattering roller, there is at least one hopper (not shown) for collecting excess abrasion-resistant particles (i.e. not scattered on the at least one wood-based panel, but rather, before the wood-based panel is moved by means of the transport device under the scattering roller, in front of the same falling abrasion-resistant particles).

The first resin layer is then dried in the first convection dryer 1a at 150-250° C. for 20-50 s.

This is followed by a second double applicator 2 for applying a second resin layer and a second convection dryer 2a for drying the second resin layer.

The third double coating unit 3 for the application of the third resin layer can be followed by another scattering device 20 for the application of glass beads on the third resin layer followed by a third convection dryer 3a for drying the third resin layer. The scattering device 20 for the glass beads is optional. The glass beads can also be applied together with the third resin layer.

After application of the fourth to sixth resin layer in a fourth to sixth double application unit 4, 5, 6 and drying in a convection dryer 4a, 5a, 6a each, the layer structure is cured in a short-cycle press 7 at a pressing temperature of 180-220° C. and a pressing time of 5 to 25 seconds under a specific pressure of 35-55 kg/cm$^2$. The pressed sheets are cooled and stored.

Figure 2:
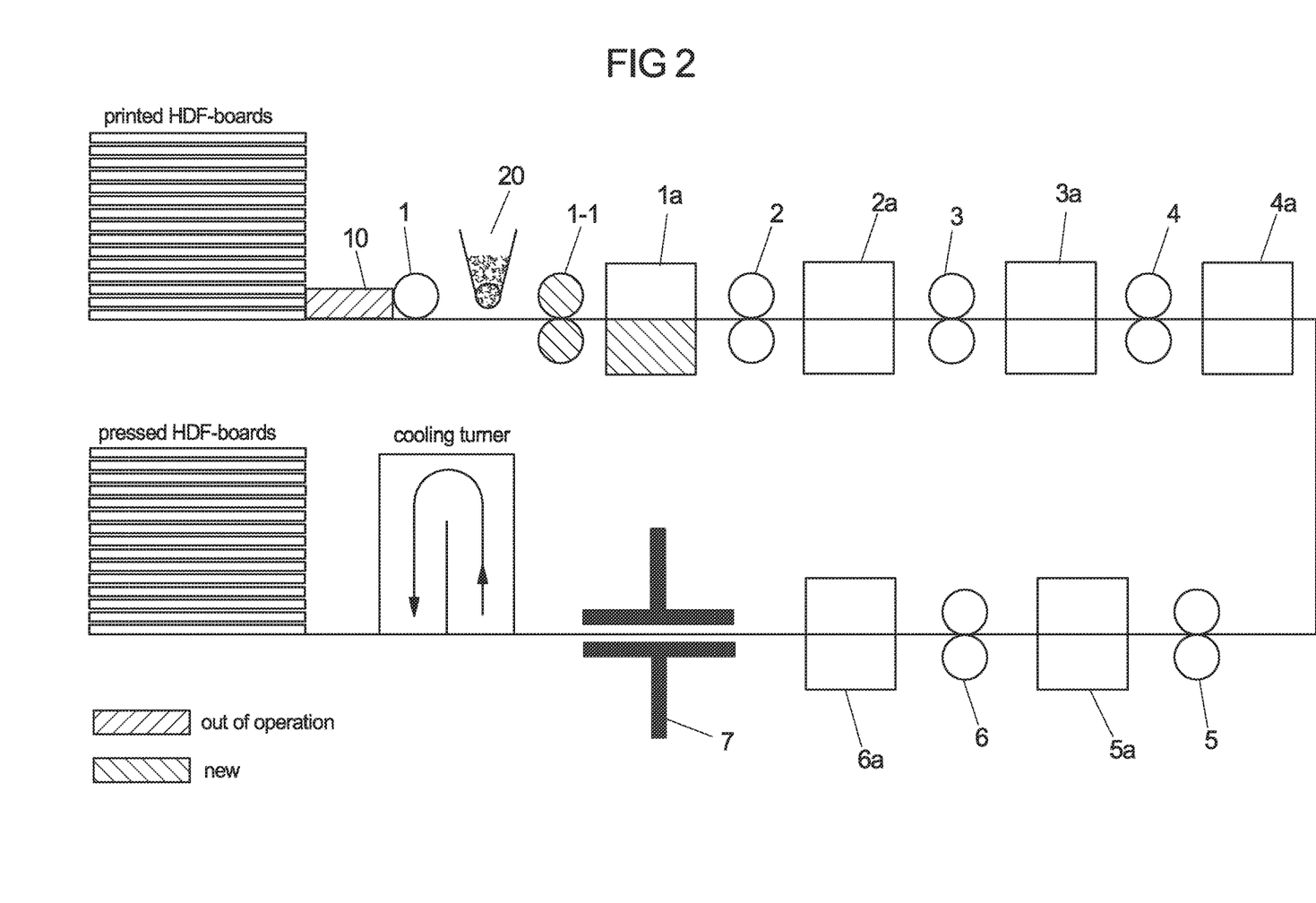
FIG. 2 is schematic diagram of a production line of a wood-based panel using the process according to the invention.

In the invention-related production line shown schematically in FIG. 2, the IR dryer 10 is removed or switched off. Removal of the IR dryer from the production line avoids the electrostatic charging of the board surface that would otherwise occur in the IR dryer, thus enabling the formation of a homogeneous scattering curtain of the corundum.

Furthermore, an additional double-sided applicator 1-1 is installed behind the one-sided applicator 1 (grooved roller) and the scattering device 20 in the processing direction, in which the panel coated with melamine-formaldehyde resin and corundum is coated with melamine-formaldehyde resin (approx. 20 g/m$^2$). At the same time, the unattached corundum is removed in small quantities and accumulates in the melamine resin liquor until saturation (about 10 wt. %). This lost portion of the corundum is now continuously re-applied to the board by the roller application of the coating unit 1-1. By the second application the corundum grains are covered with liquid resin or worked into the overlay layer. This prevents the corundum from being removed in the convection dryer due to the high air turbulence.

The coating unit 1-1 is followed by a convection dryer 1a followed by the other double coating units 2, 3, 4, 5, 6 for simultaneous application of the respective resin layer on the top and bottom side of the separated printed material sheets as well as the convection dryers 2a, 3a, 4a, 5a, 6a arranged behind the coating units in the processing direction.

The following advantages result from the conversion measures taken in the production line of FIG. 2: Homogeneous scattering pattern; no loss of corundum in the dryer; reduction of the corundum consumption for required abrasion class; reduction of the dust load of the environment and the obvious health burden of the employees; as well as corundum dust deposits on plant parts of the production line;

reduction of the corundum deposit on the transport chains and thus saving of additional material costs by replacing the chains.

The invention claimed is:

1. A method of producing a panel comprising:
   providing a panel comprising wood and having a top side and a bottom side, wherein at least one decorative layer is provided on the top side, and wherein a protective layer of a partially but not yet completely cured resin is applied to a decorative layer;
   applying a first resin layer to the protective layer on the top side of the panel, wherein the provided panel including the decorative layer and the protective layer is not heated in a dryer before the application of the first resin layer;
   scattering abrasion-resistant particles on the first resin layer on the top side of the panel, wherein the first resin layer on the top side of the panel provided with the abrasion-resistant particles is not dried after application;
   applying a second layer of resin on the first resin layer on the top side of the panel; and
   subsequently, drying the structure consisting of the first resin layer and the second resin layer on the top side of the panel in at least one drying device,
   wherein the abrasion-resistant particles comprise one or more of corundum, boron carbide, silicon dioxide, and silicon carbide, and
   wherein the second resin layer is applied using a roller applicator and at least a portion of the abrasion-resistant particles scattered on the first resin layer and not fixed to or perpetrated onto the first resin layer are taken up by the roller applicator and entrained in the resin applied as the second resin layer such that, after drying, both the first and second resin layers contain abrasion-resistant particles.

2. The method according to claim 1, wherein the first resin layer and the second resin layer are aqueous formaldehyde-containing resins.

3. The method according to claim 1, wherein the first resin layer is applied in an amount of 10-100 g/m$^2$.

4. The method according to claim 3, wherein the first resin layer is applied in an amount of 40-80 g/m$^2$.

5. The method according to claim 3, wherein the first resin layer is applied in an amount of 45-60 g/m$^2$.

6. The method according to claim 1, wherein the amount of scattered abrasion-resistant particles is 10 to 50 g/m$^2$.

7. The method according to claim 6, wherein the amount of scattered abrasion-resistant particles is 10 to 30 g/m$^2$.

8. The method according to claim 6, wherein the amount of scattered abrasion-resistant particles is 15 to 25 g/m$^2$.

9. The method according to claim 1, wherein the second resin layer applied to the top side of the panel is applied in an amount of 10-50 g/m$^2$.

10. The method according to claim 9, wherein the second resin layer to be applied to the top side of the panel is applied in an amount of 20-30 g/m$^2$.

11. The method according to claim 9, wherein the second resin layer to be applied to the top side of the wood based panel is applied in an amount of 20-25 g/m$^2$.

12. The method according to claim 1, wherein the second resin layer comprises 5-15 wt % of abrasion-resistant particles.

13. The method according to claim 1, wherein at least one further resin layer is applied to the dried first and second resin layer on the top side of the panel and is dried after each application.

14. The method according to claim 13, wherein the at least one further resin layer comprises glass beads and/or fibres.

15. The method according to claim 14, wherein the at least one further resin layer comprises wood fibres or cellulose fibres.

16. The method according to claim 13, wherein a third, fourth, fifth and sixth resin layer are applied to the dried first and second resin layer provided with the abrasion-resistant particles on the top side of the panel and each resin layer is dried after application.

17. The method according to claim 1, wherein at least one resin layer is applied to the bottom side of the panel together with the second resin layer to be applied to the top side of the panel.

18. The method according to claim 1, wherein the panel is medium density fibre (MDF), high density fibre (HDF), coarse particle board, plywood and/or a wood-plastic panel.

19. The method according to claim 1, wherein each of the first resin layer and the second resin layer are selected from the group consisting of melamine-formaldehyde resin, urea-formaldehyde resin and melamine-urea-formaldehyde resin.

20. A production line for carrying out a method according to claim 1, the production line comprising:
   at least a first application device for applying the first resin layer to the top side of the panel, wherein no active drying device is provided in front of the first application device;
   at least one device arranged downstream of the first application device in a processing direction for scattering a predetermined quantity of abrasion-resistant particles;
   at least one second application device having a roller applicator and arranged downstream of the first application device and scattering device in the processing direction for applying a second resin layer to the top side of the panel,
   wherein no drying device is provided between the scattering device and the second application device;
   at least one first drying device arranged downstream of the second application device in the processing direction for drying the layered structure of first and second resin layers;
   at least one further application device arranged downstream of the first drying device in the processing direction for applying a further resin layer to the top and/or bottom side of the panel and a subsequent drying device for drying the further top and/or bottom resin layer; and
   a short-cycle press arranged downstream of the last drying device in the processing direction.

21. The production line according to claim 20, wherein the second application device for applying the second resin layer is designed as a double applicator, so that a resin layer is applied to the bottom side of the panel simultaneously with the second resin layer on the top side.

* * * * *

UNITED STATES PATENT AND TRADEMARK OFFICE
CERTIFICATE OF CORRECTION

PATENT NO. : 11,198,319 B2
APPLICATION NO. : 16/761937
DATED : December 14, 2021
INVENTOR(S) : Andre Denk et al.

It is certified that error appears in the above-identified patent and that said Letters Patent is hereby corrected as shown below:

In the Claims

Column 13, Line 10, Claim 1, delete "a" and insert -- the --

Column 13, Line 21, Claim 1, delete "on" and insert -- to --

Column 13, Line 32, Claim 1, delete "perpetrated onto" and insert -- penetrated into --

Column 13, Line 35, Claim 1, after "contain" insert -- the --

Column 13, Line 59, Claim 11, after "the" delete "wood based"

Signed and Sealed this
Nineteenth Day of April, 2022

Katherine Kelly Vidal
*Director of the United States Patent and Trademark Office*